US009028285B2

(12) United States Patent
Tamba (10) Patent No.: US 9,028,285 B2
(45) Date of Patent: May 12, 2015

(54) HYBRID MARINE DRIVETRAIN (75) Inventor: Richard Terrence Tamba, New South Wales (AU)

(73) Assignee: NT Consulting International Pty Limited (AU)

( * ) Notice: Subject to any disclaimer, the term of this patent is extended or adjusted under 35 U.S.C. 154(b) by 302 days.

(21) Appl. No.: 13/060,960

(22) PCT Filed: Aug. 28, 2009

(86) PCT No.: PCT/AU2009/001113
§ 371 (c)(1),
(2), (4) Date: May 9, 2011

(87) PCT Pub. No.: WO2010/022464
PCT Pub. Date: Mar. 4, 2010

(65) Prior Publication Data
US 2011/0237141 A1    Sep. 29, 2011

(30) Foreign Application Priority Data

Aug. 29, 2008 (AU) ................................. 2008904495

(51) Int. Cl.
*B63H 21/20* (2006.01)
*B63H 23/12* (2006.01)
*B63H 23/16* (2006.01)

(52) U.S. Cl.
CPC ........... *B63H 21/20* (2013.01); *Y10T 74/19051* (2015.01); *B63H 23/12* (2013.01); *B63H 23/16* (2013.01); *B63H 2021/202* (2013.01); *Y02T 70/5236* (2013.01)

(58) Field of Classification Search
CPC ...... B63H 21/213; B63H 21/20; B63H 23/30; B63H 23/12; B63H 23/16; B63H 2021/202
USPC ....................................... 440/3, 84, 85, 86, 87
See application file for complete search history.

(56) References Cited

U.S. PATENT DOCUMENTS 3,922,997 A * 12/1975 Jameson ......................... 440/75
4,661,714 A * 4/1987 Satterthwaite et al. ....... 290/4 R
(Continued)

FOREIGN PATENT DOCUMENTS

EP    0528412    2/1993
EP    1894836    3/2008
(Continued)

OTHER PUBLICATIONS

Patent Cooperation Treaty International Search Report, PCT/AU2009/001113, International Filing Date Aug. 28, 2009, 5 pages.

*Primary Examiner* — S. Joseph Morano
*Assistant Examiner* — Anthony Wiest
(74) *Attorney, Agent, or Firm* — Daly, Crowley, Mofford & Durkee, LLP (57) ABSTRACT

A hybrid marine drivetrain for a watercraft, the drivetrain including a driveshaft for driving a propulsion device of the watercraft, an internal combustion engine for driving the driveshaft, a motor for driving the driveshaft, a storage unit for storing energy in a form suitable for operating the motor, and a generator driven by the internal combustion engine for generating energy to power the motor, wherein a drive output of the motor is in direct driving connection with the driveshaft, a drive output of the internal combustion engine is in direct driving connection with a rotor of the generator, and a clutch is provided to selectively couple/decouple drive from the internal combustion engine to/from the driveshaft.

32 Claims, 12 Drawing Sheets

(56) References Cited

U.S. PATENT DOCUMENTS

| | | | |
|---|---|---|---|
| 6,026,921 A | 2/2000 | Aoyama et al. | |
| 6,645,017 B1 * | 11/2003 | Skrzypek et al. | 440/6 |
| 6,857,918 B1 | 2/2005 | Lebreux et al. | |
| 7,147,523 B2 * | 12/2006 | Mori et al. | 440/3 |
| 7,240,653 B2 * | 7/2007 | Marchand et al. | 123/179.19 |
| 7,473,149 B2 * | 1/2009 | Mizokawa | 440/6 |
| 7,645,174 B2 * | 1/2010 | Chung et al. | 440/6 |
| 2007/0141924 A1 | 6/2007 | Yasuda et al. | |
| 2007/0184728 A1 * | 8/2007 | Kennedy | 440/3 |

FOREIGN PATENT DOCUMENTS

| | | |
|---|---|---|
| EP | 1914161 | 4/2008 |
| GB | 764005 | 12/1956 |

* cited by examiner

FIGURE 2

| Speed Condition | ICE A | Generator B | Battery C | Clutch D | Electric Motor E |
|---|---|---|---|---|---|
| Low Speed | OFF | OFF | ON | OFF | ON |
| Mid Speed | ON | ON | ON | OFF | ON |
| Medium Speed | ON | ON | ON | OFF | ON |
| Fast Speed | ON | ON | ON | ON | ON |
| Max Speed | ON | OFF | OFF | ON | OFF |

| Speed Cond. | ICE 1 | ICE 2 | Gen 1 | Gen 2 | Main Battery | Clutch 1 | Clutch 2 | E-motor 1 | E-motor 2 |
|---|---|---|---|---|---|---|---|---|---|
| Low | OFF | OFF | OFF | OFF | ON | OFF | OFF | ON | ON |
| Mid | ON | ON | OFF | OFF | ON | OFF | OFF | ON | ON |
| Med. | ON | ON | ON | ON | ON | OFF | OFF | ON | ON |
| Fast | ON | ON or OFF | ON | ON or OFF | ON or OFF | ON | ON | OFF | OFF |
| Max. | ON | OFF | ON | OFF | OFF | ON | ON | OFF | OFF |

| Speed Cond. | ICE | Generator | Battery | Clutch 1 | E-motor 1 | Clutch 2 | E-motor 2 |
|---|---|---|---|---|---|---|---|
| Low | OFF | OFF | ON | OFF | ON | OFF | ON |
| Mid | ON | ON | ON | OFF | ON | OFF | ON |
| Med. | ON | ON | ON | OFF | ON | OFF | ON |
| Fast | ON | ON | ON | ON | ON | ON | ON |
| Max. | ON | OFF | OFF | ON | OFF | ON | OFF |

HYBRID MARINE DRIVETRAIN

CROSS REFERENCE TO RELATED APPLICATIONS

The present application is a U.S. national stage application under 35 U.S.C. §371 of International Application No. PCT/AU2009/001113, having international filing date Aug. 28, 2009 and entitled "Hybrid Marine Drivetrain", and which is a continuation and claims the benefit under 35 U.S.C. §119(a) of Australian Patent Application 2008904495, filed Aug. 29, 2008.

FIELD OF THE INVENTION

This invention relates to a hybrid marine drivetrain and, more particularly but not exclusively, to a hybrid marine drivetrain having a propulsion component driven by an internal combustion engine and/or an electric motor.

BACKGROUND OF THE INVENTION

Existing hybrid marine drives are based around using an electric motor, attached to the back of an internal combustion engine, between the engine and a gearbox, to drive a propeller shaft of the boat. For example, with reference to FIG. 1, the internal combustion engine 10 and the electric motor/generator unit 12 are coupled via a one-way-clutch or a mechanically/electrically/hydraulically operated clutch. The electric motor/generator unit 12 is interposed between the engine 10 and a gearbox 14, which drives the propeller shaft 16. Such a system is able to turn the propeller shaft 16 using only the electric motor, a combination of the electric motor and the internal combustion engine, or only the internal combustion engine.

However, to correctly power manage an electric hybrid system in a boat, there needs to be an additional degree of freedom. Current systems do not allow the internal combustion engine to spin faster than the propeller shaft and, in twin engine installations, do not allow one engine to spin faster than the other, thus not allowing one engine to provide more power or load than the other. If this were to occur, the boat would be driven off course, favouring the side that produces more propeller shaft speed.

Figure 1:
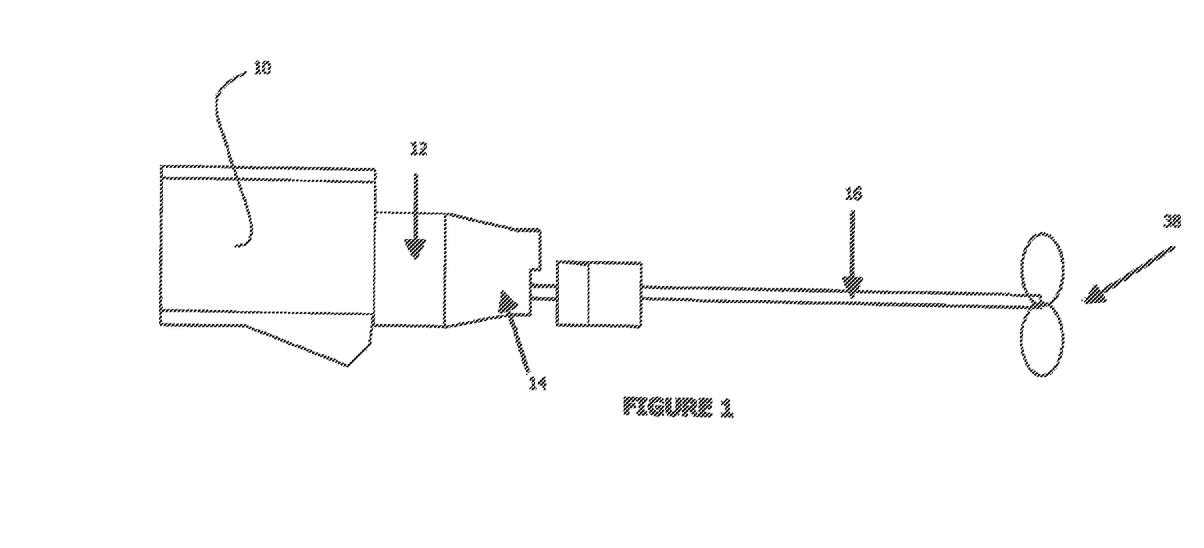
FIG. 1 is a top diagrammatic view of an existing hybrid marine drive system.
Figure 2:
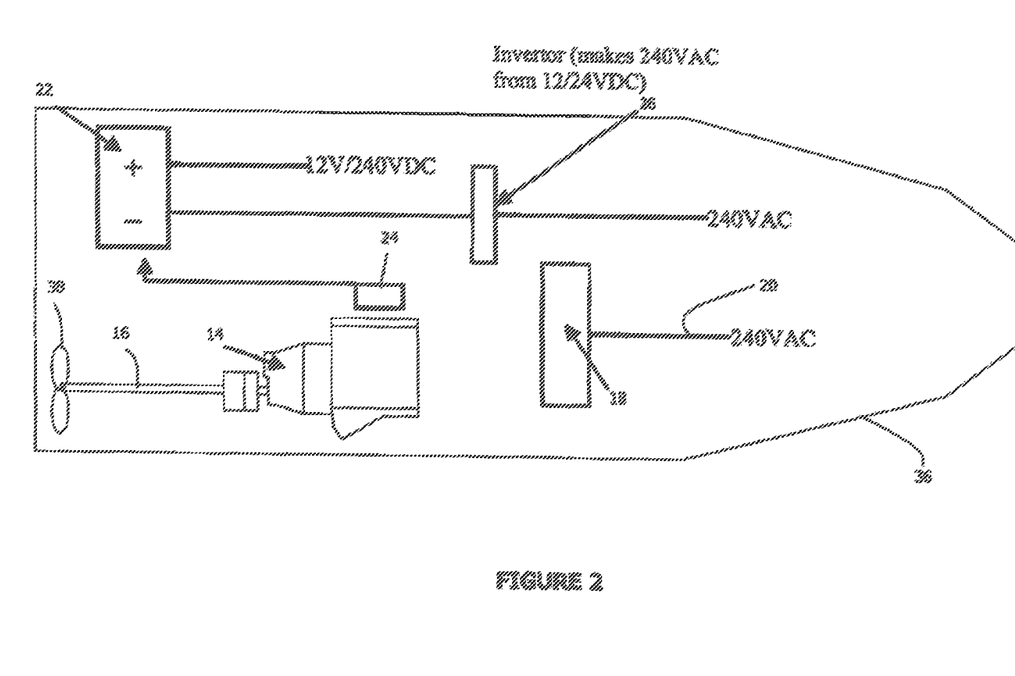
FIG. 2 is a top diagrammatic view of an existing single engine marine drivetrain.
Figure 3:
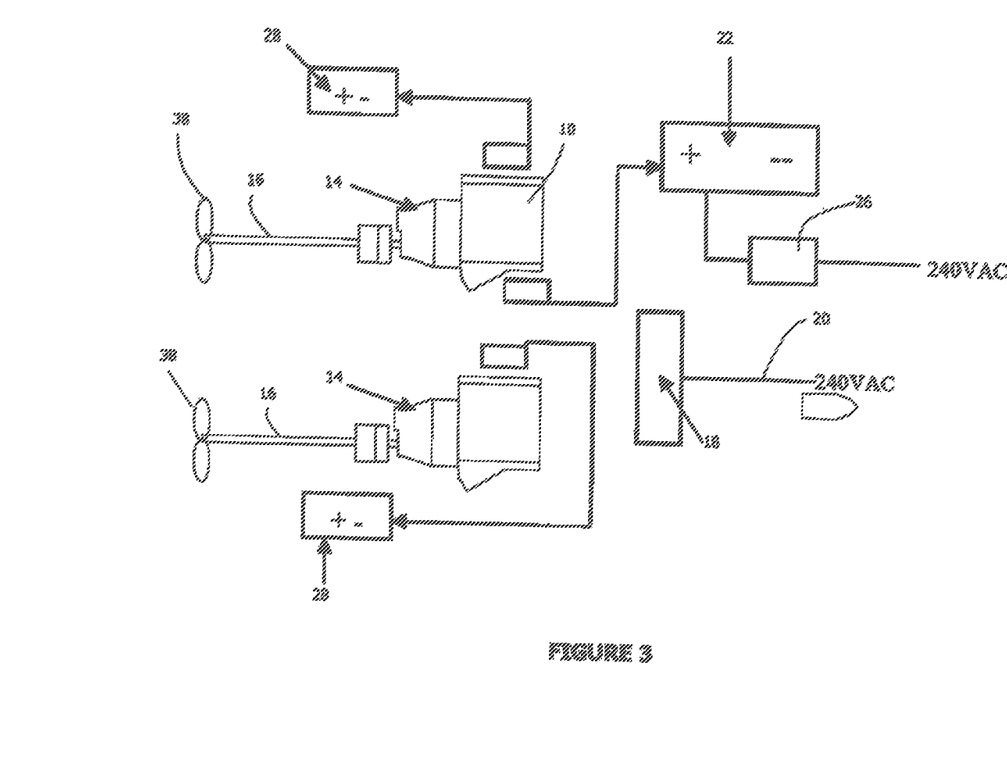
FIG. 3 is a top diagrammatic view of an existing twin engine marine drivetrain.

FIGS. 2 and 3 show traditional arrangements incorporating drive systems as shown in FIG. 1. More particularly, FIG. 2 shows a traditional single engine arrangement, and FIG. 3 shows a traditional twin engine arrangement. Each of these arrangements does not allow the internal combustion engine 10 to spin faster than the propeller shaft 16, and the twin engine arrangement shown in FIG. 3 does not allow one engine to spin faster than the other engine without the boat being driven off course.

Furthermore, each of the arrangements shown in FIG. 2 and FIG. 3 necessitates a separate generator unit 18 for powering an AC power circuit 20 of the boat. Power to the AC power circuit 20 is also provided by a house battery 22 (charged by an alternator 24), via an invertor 26. In the case of the traditional twin engine arrangement shown in FIG. 3, each of the internal combustion engines 10 is provided with a separate start battery 28.

Figure 4:
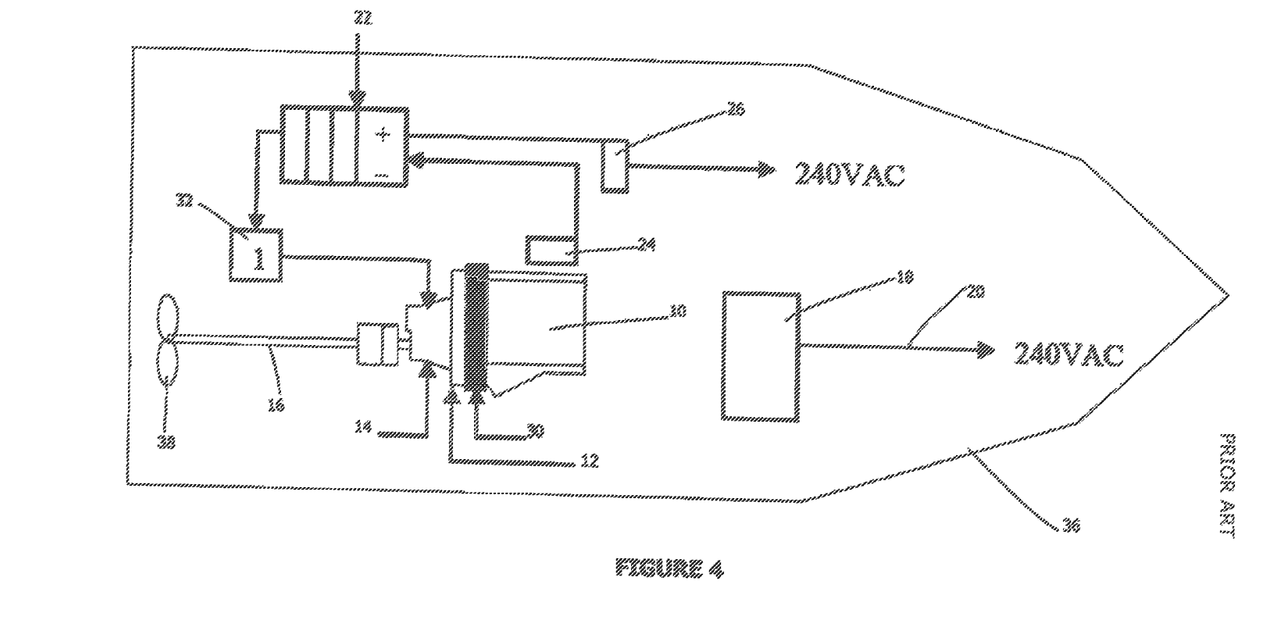
FIG. 4 is a top diagrammatic view of an existing single engine hybrid marine drivetrain.
Figure 5:
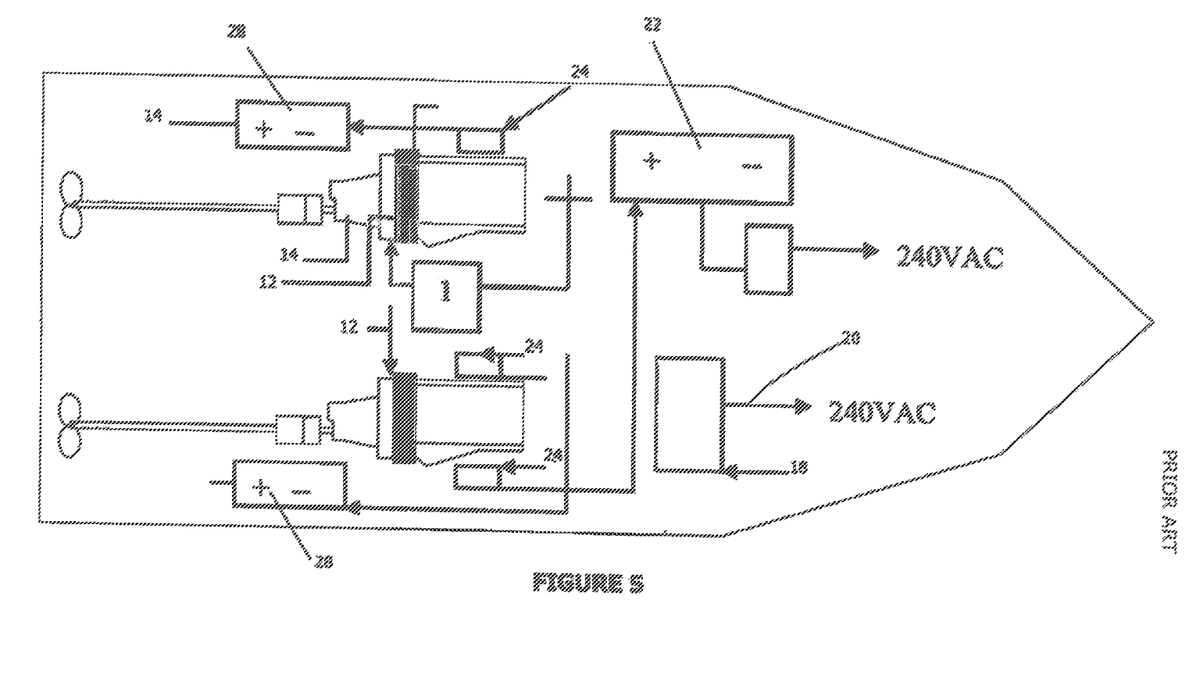
FIG. 5 is a top diagrammatic view of an existing twin engine hybrid marine drivetrain.

FIGS. 4 and 5 show previously proposed hybrid marine drives, wherein each of the internal combustion engines 10 is coupled to an associated electric motor/generator unit 12 via a clutch 30. In turn, each of the electric motor/generator units 12 drives an associated gearbox 14, an output of which is coupled to drive the associated propeller shaft 16. The single engine arrangement shown in FIG. 4 and the twin engine arrangement shown in FIG. 5 both utilise a separate generator unit 18 which is driven by its own internal combustion engine. Also included is a power controller 32 which converts battery power into higher voltage to allow the electric motors 12 to drive the propeller shafts 16, and which also converts power from the electric motor/generator units 12 to charge the house battery 22. Examples of the invention seek to solve, or at least ameliorate, one or more disadvantages of previous hybrid marine drive arrangements.

SUMMARY OF THE INVENTION

In accordance with one aspect of the present invention, there is provided a hybrid marine drivetrain for a watercraft, the drivetrain including a driveshaft for driving a propulsion device of the watercraft, an internal combustion engine for driving the driveshaft, a motor for driving the driveshaft, a storage unit for storing energy in a form suitable for operating the motor, and a generator driven by the internal combustion engine for generating energy to power the motor, wherein a drive output of the motor is in direct driving connection with the driveshaft, a drive output of the internal combustion engine is in direct driving connection with a rotor of the generator, and a clutch is provided to selectively couple/decouple drive from the internal combustion engine to/from the driveshaft.

Preferably, the motor is an electrical motor, the generator is an electrical generator, and the storage unit is a battery. More preferably, the drivetrain includes a power controller in electrical communication with the electrical motor, the generator and the battery, the power controller being adapted for converting power from the battery for driving the electric motor and for converting power from the generator for charging the battery. Even more preferably, the generator is arranged to power an alternating current AC power circuit of the watercraft via the power controller. More preferably still, the power controller is arranged to supply power to the AC power circuit, both directly when the generator is operating and also by charging the battery from which AC power is drawn via an inverter.

In a preferred example, the hybrid marine drivetrain includes a starter battery for starting the internal combustion engine, and an alternator driven by the internal combustion engine for charging the starter battery.

Preferably, the rotor of the generator rotates coaxially with respect to a crankshaft of the internal combustion engine. More preferably, a stator of the generator is fixedly mounted relative to a casing of the internal combustion engine.

In one form, the electric motor is arranged coaxially with the generator and internal combustion engine.

In an alternative form, the electric motor is arranged such that a rotor of the motor rotates about an axis which is offset and parallel to an axis of rotation of the generator rotor and crankshaft. Preferably, drive from the electric motor is coupled to the driveshaft by an offset drive. More preferably, the hybrid marine drivetrain includes a gearbox arranged to transmit drive from the electric motor and the internal combustion engine to the driveshaft. In one form, the offset drive is incorporated into the gearbox.

Preferably, the drivetrain is adapted to operate in a range of modes, selected either manually by an operator or automatically by a control system.

The following modes are provided as an example of one form of the invention. In a first, low speed mode, the driveshaft is driven by only the motor, and the motor is powered only by energy stored in the storage unit. The motor may be operable in opposite directions of rotation to effect either forward or reverse drive of the watercraft. In a second, mid speed mode the driveshaft is driven directly by only the motor, and the motor is powered by the internal combustion engine, with the clutch disengaged to enable the motor and the engine to rotate mutually independently. In a third, medium speed mode the driveshaft is driven directly by only the motor, and the motor is powered by the internal combustion engine, with the clutch disengaged to enable the motor and the engine to rotate mutually independently. In a fourth, fast speed mode the clutch is engaged such that the driveshaft is driven directly by the motor and the engine. In a final, maximum speed mode the driveshaft is driven directly by only the engine.

Preferably, in the second and third modes, engine speed of the internal combustion engine is able to be varied independently of an operating speed of the motor, to rotational speeds below, at, or above the operating speed of the motor. More preferably, the drivetrain is adapted to operate the internal combustion engine at an engine speed with maximum efficiency, independent of the rotational speed of the driveshaft or the speed of the watercraft. Even more preferably, in the second and third modes, the engine speed of the internal combustion engine is regulated to power supply of the AC power circuit.

The hybrid marine drivetrain may include an additional propulsion device, and an additional motor, internal combustion engine, clutch and generator associated with the additional propulsion device. In one example, the power controller is arranged in electrical communication with both electrical motors, both generators and the battery, the power controller being adapted for converting power from the battery for driving the electric motors and for converting power from the generators for charging the battery. In the second, mid speed mode each propulsion device is driven directly by only the respective motor, and both motors are powered by a single one of the internal combustion engines, the other of the internal combustion engines being switched off, with both clutches disengaged to enable the motors to rotate independently of their respective engines. In the third, medium speed mode each propulsion device is driven directly by only the respective motor, and both motors are powered by both of the internal combustion engines, with both clutches disengaged to enable the motors and their respective internal combustion engines to rotate mutually independently.

Preferably, the drivetrain is operable to allow different engine speeds of the two engines, the engine speeds being adjustable independently to draw more power from one engine than the other engine.

In an alternative, the hybrid marine drivetrain may include an additional propulsion device, and an additional motor and clutch associated with the additional propulsion device, wherein the internal combustion engine is used in conjunction with a split output drive for transmitting drive from the internal combustion engine to both propulsion devices. In the second, mid speed mode each propulsion device is driven directly by only the respective motor, and both motors are powered by the internal combustion engine or by a separate electrical generator, with both clutches disengaged to enable the motors to rotate independently of the internal combustion engine. In the third, medium speed mode each propulsion device is driven directly by only the respective motor, and both motors are powered by the internal combustion engine, with both clutches disengaged to enable the motors to rotate independently of the internal combustion engine.

Preferably, the or each driveshaft is a propeller shaft.
Preferably, the or each propulsion device is a propeller.

BRIEF DESCRIPTION OF THE DRAWINGS

The invention is described, by way of non-limiting example only, with reference to the accompanying drawings in which.

DETAILED DESCRIPTION

Figure 6:
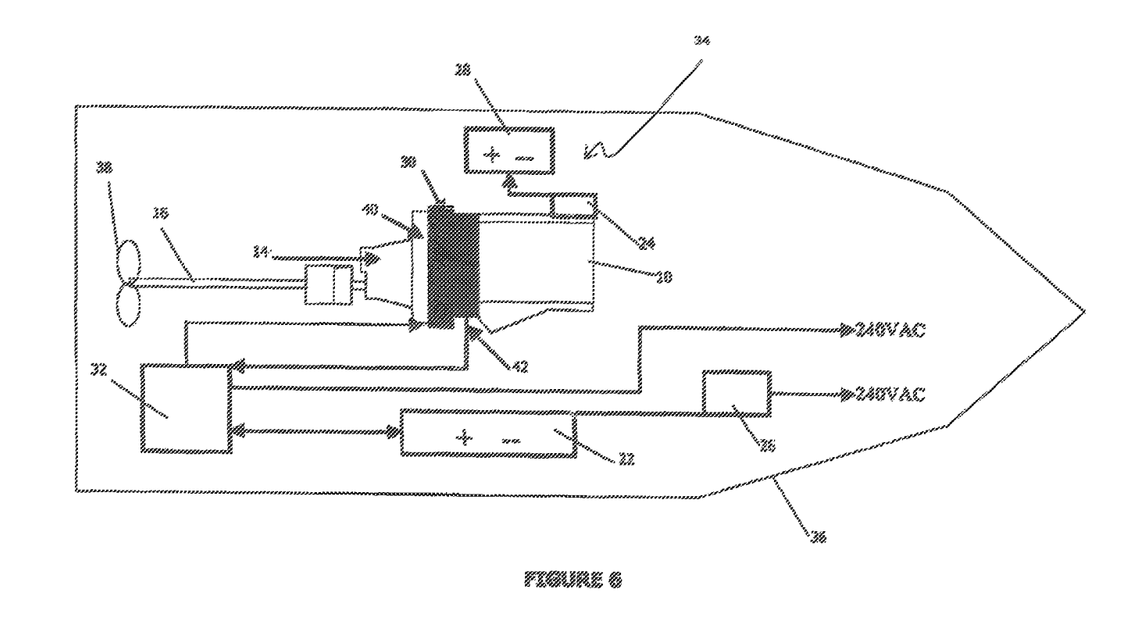
FIG. 6 is a top diagrammatic view of a single engine hybrid marine drivetrain according to an example of the invention.

With reference to FIG. 6, an example hybrid marine drivetrain 34 is formed as a single screw arrangement, meaning that it has a single screw drive. The drivetrain 34 includes a single driveshaft in the form of a propeller shaft 16 for driving a propulsion device of a watercraft 36 in which the drivetrain 34 is mounted. In the example shown, the propulsion device is in the form of a propeller 38, however, it will be appreciated by those skilled in the art that the propulsion device may take other forms such as, for example, a jet drive. The drivetrain 34 includes an internal combustion engine 10 for driving the propeller shaft 16, and a motor in the form of an electric motor 40 for driving the propeller shaft 16. A storage unit in the form of a main battery 22 is provided for storing energy in a form suitable for operating the electric motor 40.

A generator 42 is coupled directly to the internal combustion engine 10 for being driven by the engine 10 so as to generate energy to power the electric motor 40, A drive output of the electric motor 40 is in direct driving connection with the propeller shaft 16, and a gearbox 14 may be provided for desired drive ratio(s) between the electric motor 40 and the propeller shaft 16. A drive output of the internal combustion engine 10 is in direct driving connection with a rotor of the generator 42, and a clutch 30 is provided to selectively couple/decouple drive from the internal combustion engine 10 to/from the propeller shaft 16.

More specifically, as can be seen in FIG. 6, drive passes from the internal combustion 10 to the generator 42, and from the generator 42 to the clutch 30. When the clutch 30 is engaged, drive passes from the clutch 30 to the electric motor 40, then from the electric motor 40 to the gearbox 14 which, in turn, drives the propeller shaft 16 and the propeller 38 mounted at a free end thereof of the propeller shaft 16.

The hybrid marine drivetrain 34 includes a starter battery 28 for starting the internal combustion engine 10, and an alternator 24 driven by the internal combustion engine 10 for charging the starter battery 28.

Although the motor shown in the examples depicted in the drawings is in the form of an electric motor 40, it will be appreciated that the motor may take other forms such as, for example, a hydraulic pump. The form of the generator and the storage unit may vary accordingly.

The drivetrain 34 includes a power controller 32 in electrical communication with the electric motor 40, the generator 42 and the main battery 22. The power controller 32 is adapted for converting power from the main battery 22 for driving the electric motor 40, and for converting power from the generator 42 for charging the main battery 22. The generator 42 is arranged to power an alternating current AC power circuit 20 of the watercraft 36 via the power controller 32. Power is also supplied from the power controller 32 to the AC power circuit 20 by charging of the main battery 22 from which AC power is drawn via an invertor 26. In this way, power is able to be provided from the generator 42 when the internal combustion engine 10 is running, and from the main battery 22 when the internal combustion engine 10 is not running.

In this arrangement, the electric motor 40 can drive the gearbox 14 (which is optional in some cases), independently of the internal combustion engine 10. The generator 42 can power the AC power circuits of the watercraft (which may be 240 volts AC or otherwise) or provide power to the electric motor 40. Alternatively, the generator may be switched off so that the boat can run purely on battery power. Note that the generator unit 18 present in the existing arrangements shown in FIGS. 1 to 5 has been removed, so one internal combustion engine has been obviated, thus allowing more space for batteries or other items. The applicant has identified that, through obviating the separate generator unit 18 and its associated internal combustion engine, overall weight and installation space is reduced, thus allowing the fitment of more batteries. The applicant has identified that the fitment of more batteries is particularly advantageous as it may facilitate the watercraft being purely electric driven for shorter trips of one or two days, hence requiring no use of the internal combustion engine 10. As boats typically sit in a marina for long periods, connected to the shore power for weeks at a time, battery sizes versus recharge time is much less of an issue than in hybrid cars, as is battery weight.

The drivetrain 34 is adapted to operate in a range of modes, selected either manually by an operator or automatically by a control system. An example of a range of modes of a usage cycle of the single screw hybrid marine drivetrain 34 of FIG. 6 is described with reference to the table of FIG. 7. In a first, low speed mode, the propeller shaft 16 is driven by only the electric motor 40, and the electric motor 40 is powered by only the battery 22. The electric motor 40 may be operable in opposite directions of rotation to effect either forward or reverse drive of the watercraft 36, thus obviating the need for a typical Forward-Neutral-Reverse drive in the gearbox 14. In a second, mid speed mode the propeller shaft 16 is driven directly by only the electric motor 14, and the electric motor 40 is powered by the internal combustion engine 10, with the clutch 30 disengaged to enable the electric motor 40 and the internal combustion engine 10 to rotate mutually independently. In a fourth, fast speed mode, the clutch 30 is engaged such that the propeller shaft 16 is driven directly by the electric motor 40 and the internal combustion engine 10. In a final, maximum speed mode the propeller shaft 16 is driven directly by only the internal combustion engine 10.

Figure 7:
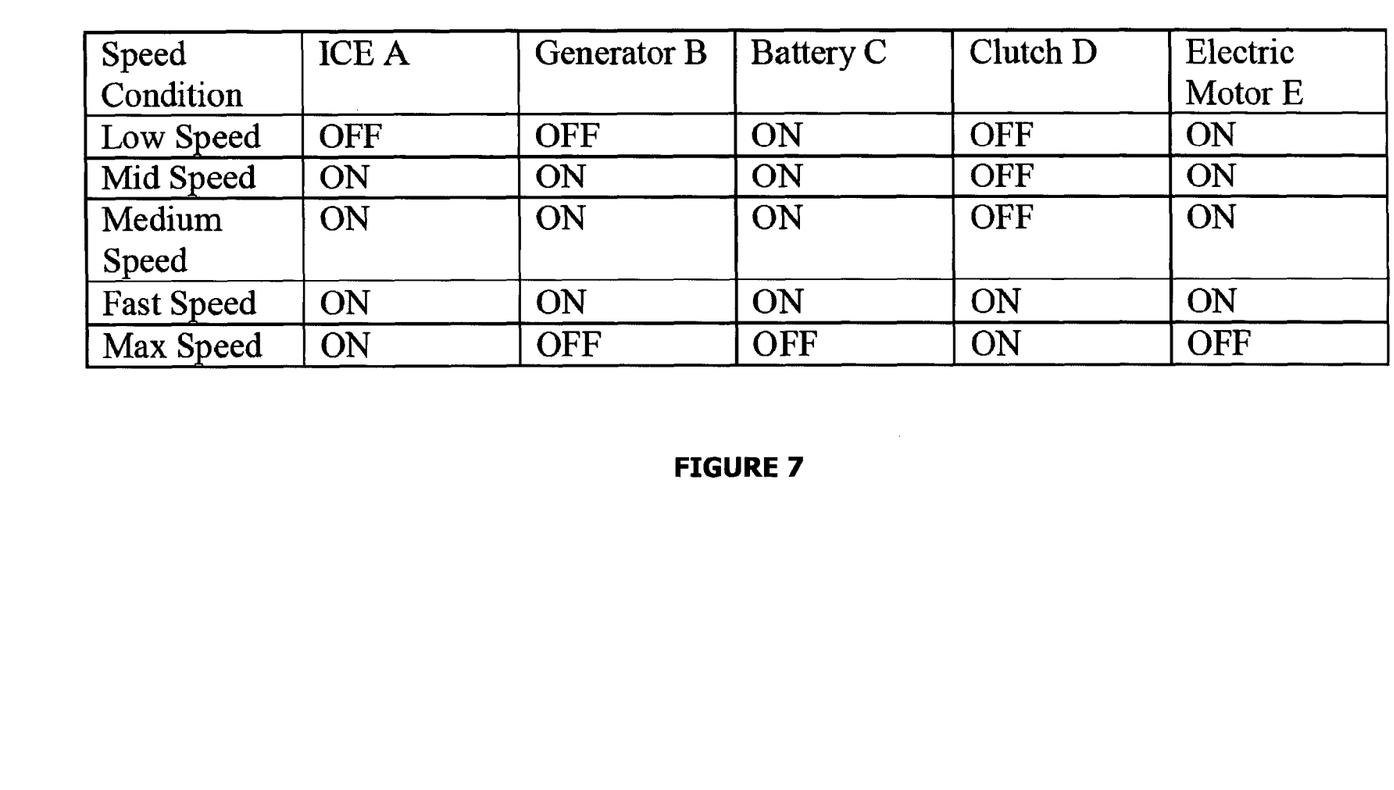
FIG. 7 is a table showing different operating modes of the hybrid marine drivetrain of FIG. 6.

In the mid speed ranges, the internal combustion engine speed can be adjusted to provide additional power to supply to the 240 volts AC circuits, so, the engine 10 can run faster than the propeller shaft 16 depending on load requirements, or slower than the propeller shaft 16 if necessary. More specifically, in the second and third modes, engine speed of the internal combustion engine 10 is able to be varied independently of an operating speed of the electric mode 40, to rotational speeds below, at, or above the operating speed of the electrical motor. More preferably, the drivetrain 34 is adapted to operate the internal combustion engine 10 at an engine speed with maximum efficiency, independent of the rotational speed of the propeller shaft 16 or the speed of the watercraft 36.

Figure 8:
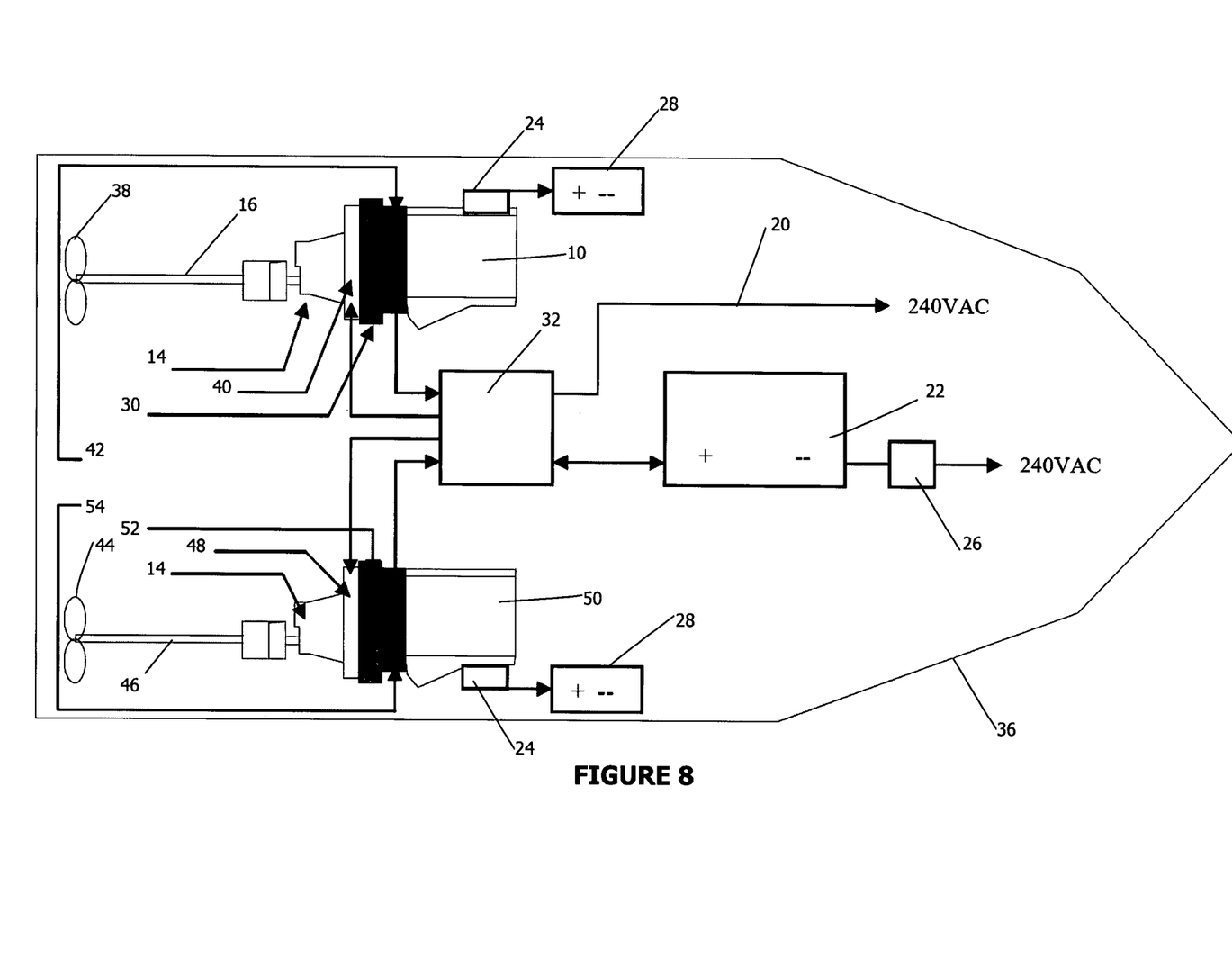
FIG. 8 is a top diagrammatic view of a twin engine hybrid marine drivetrain according to an example of the invention.

With reference to FIG. 8, the hybrid marine drivetrain 34 may include an additional propeller 44 and an additional propeller shaft 46 in a twin screw arrangement. An additional motor 48, internal combustion engine 50, clutch 52 and generator 54 are associated with the additional propeller 44. In the example shown, the power controller 32 is arranged in electrical communication with both electrical motors 40, 48, both generators 42, 54 and the main battery 22. The power controller 32 is adapted for converting power from the battery 22 for driving the electric motors 40, 48 and for converting power from the generators 42, 54 for charging the battery 22.

Figure 9:
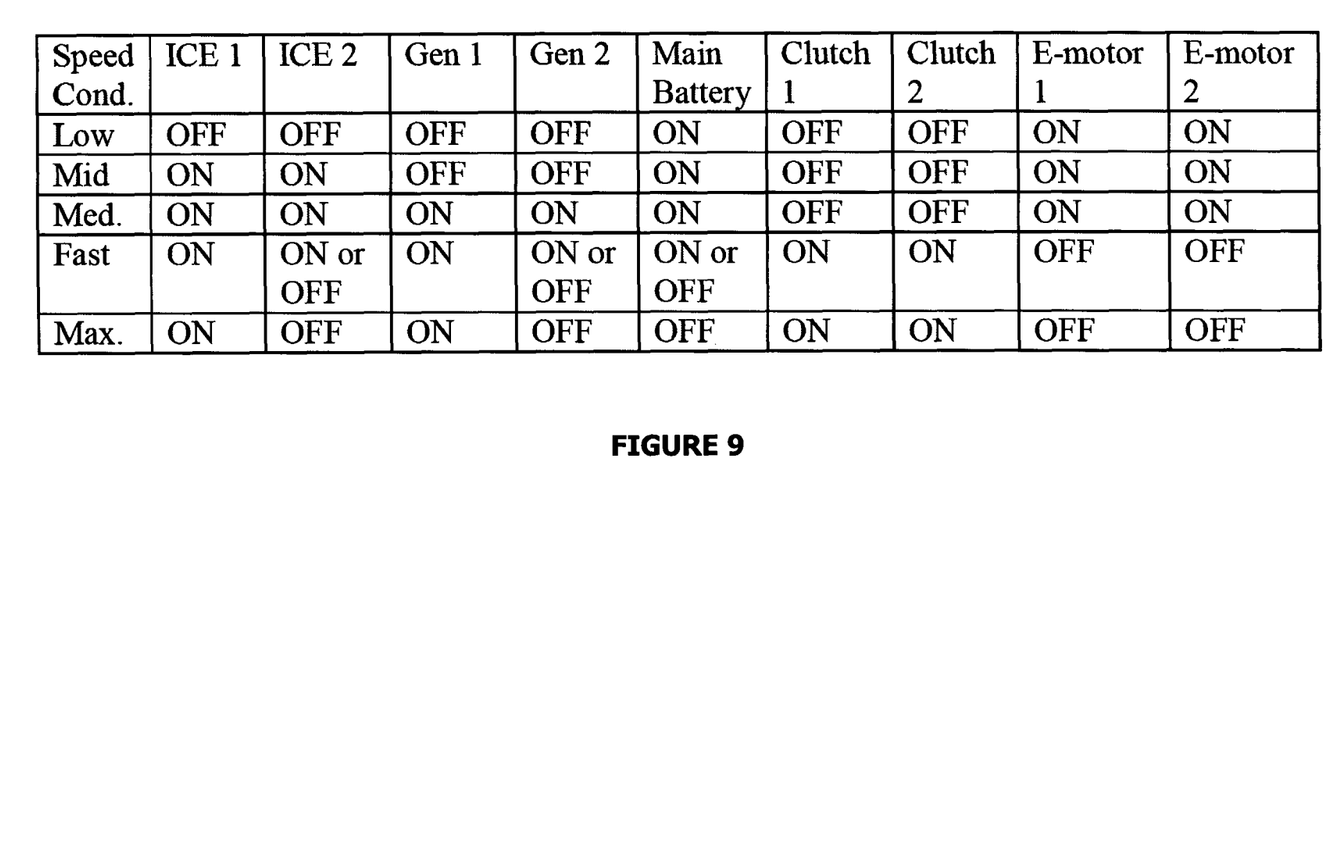
FIG. 9 is a table showing different operating modes of the hybrid marine drivetrain of FIG. 8.

The modes of operation for the twin screw drivetrain 34 shown in FIG. 8, in accordance with an example are listed in the table of FIG. 9. The different modes for this twin screw drivetrain are similar to the modes for the single screw drivetrain shown in FIG. 6, with a few differences resulting from the different configuration. As can be seen, in the second, mid speed mode each of the propellers 38, 44 is driven directly by only the respective electric motor 40, 48, and both motors 40, 48 are powered by a single one of the internal combustion engines 10, 50, the other of the internal combustion engines 50, 10 being switched off. In the second, mid speed mode both clutches 30, 52 are disengaged to enable the electric motors 40, 48 to rotate independently of their respective engines 10, 50. In the third, medium speed mode, each of the propellers 38, 44 is driven directly by only the respective electric motor 40, 48, and both of the electric motors 40, 48 are powered by both of the internal combustion engines 10, 50. Both clutches 30, 52 are disengaged to enable the electric motors 40, 48 and their respective internal combustion engines 10, 50 to rotate mutually independently.

The twin screw drivetrain 34 of FIG. 8 is operable to allow different engine speeds of the two internal combustion engines 10, 50, and the engine speeds are adjustable independently to draw more power from one engine than the other engine. Because the electric motors 40, 48 and internal combustion engines 10, 50 have a further degree of flexibility resulting from separating the generators 42, 54 and the electric motors 40, 48, it is possible to run both propeller shafts 16, 46 of the watercraft 36 independently, and to use only a single one of the internal combustion engines 10, 50 to power both electric motors 40, 48 (mid speed mode). The internal combustion engine being used in the mid speed mode may be alternated between the two internal combustion engines 10, 50 so as to maintain equal wear in both engines. The speeds of the internal combustion engines 10, 50 can be matched to the required combination of power required for propulsion of the watercraft and for supply of power to the AC power circuit 20. In the max speed mode, all parasitic loads are turned off and both internal combustion engines 10, 50 direct drive via the respective one of the clutches 30, 52 to the propeller shafts 16, 46 so that full engine power is used to propel the watercraft 36.

Figure 10:
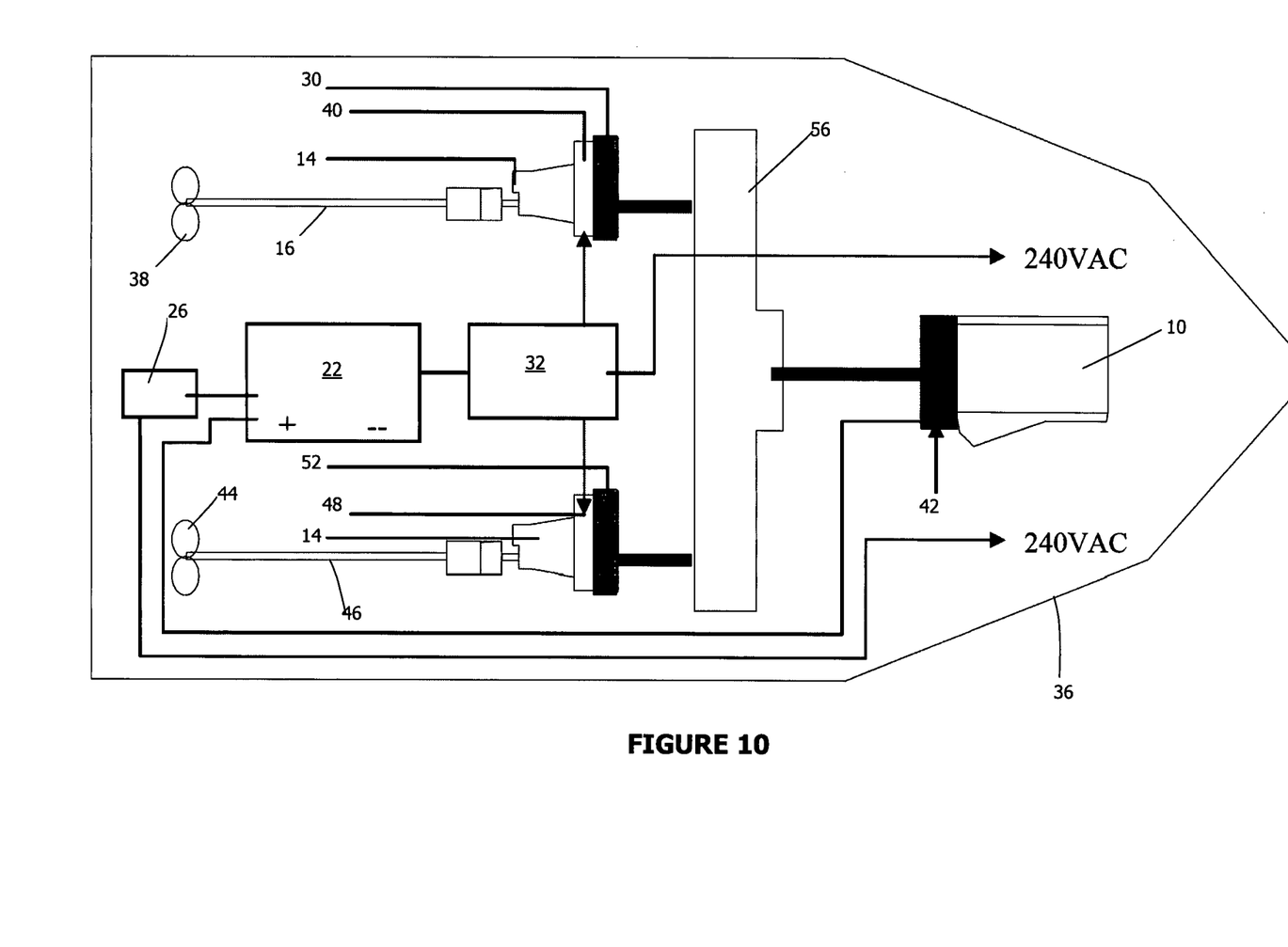
FIG. 10 is a top diagrammatic view of a twin screw hybrid marine drivetrain according to another example of the present invention.

An alternative twin screw hybrid marine drivetrain 34 is shown in FIG. 10. In this example, the drivetrain 34 includes an additional propeller 44, together with an additional motor 48 and an additional clutch 52 associated with the additional propeller 44. However, this arrangement differs from the arrangement of FIG. 8 as a single internal combustion engine is used in conjunction with a split output drive 56 for transmitting drive from the internal combustion engine to both propellers 38, 44.

Figure 11:
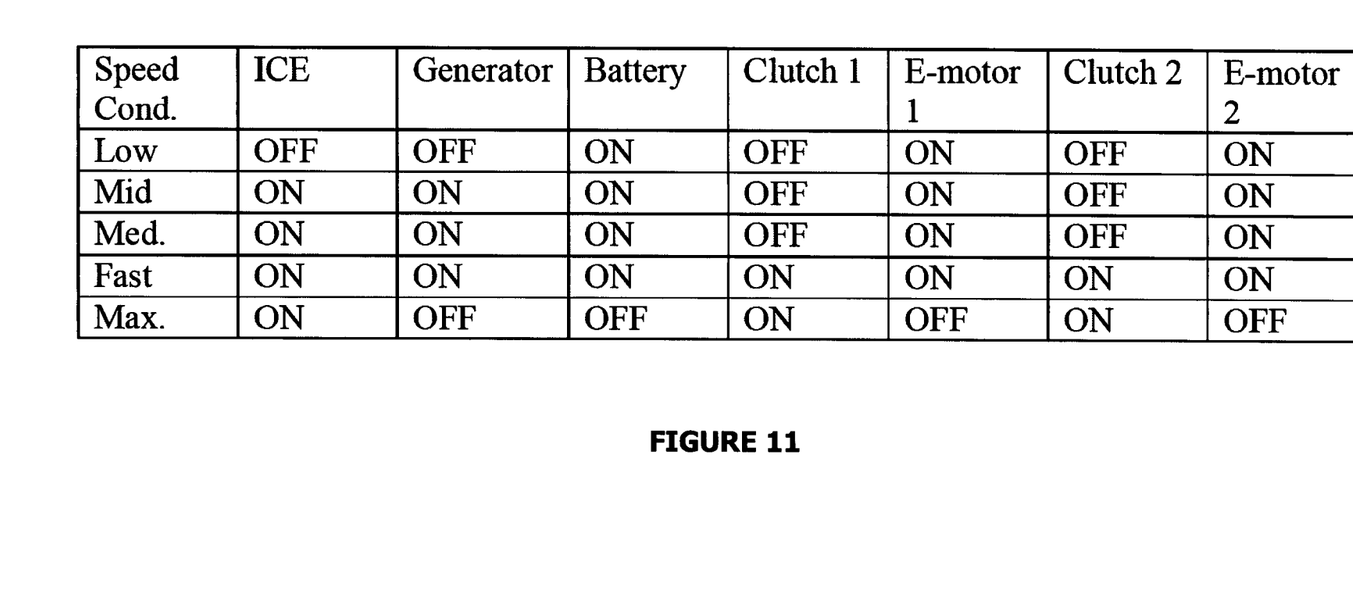
FIG. 11 is a table showing different operating modes of the hybrid marine drivetrain of FIG. 10.

The operational modes for the drivetrain 34 of FIG. 10 are shown in the table of FIG. 11. As can be seen, the modes for this example are similar to the modes shown in the table in FIG. 7, however some differences do exist as a result of the twin screw arrangement. In the second, mid speed mode each of the propellers 38, 44 is driven directly by only the respective electric motor 40, 48 and both electric motors 40, 48 are powered by the single internal combustion engine 10. Both clutches 30, 52 are disengaged to enable the electric motors 40, 48 to rotate independently of the internal combustion engine 10. The applicant has determined that in one variation a separate generator unit with its own internal combustion engine may be provided, and that smaller generator unit (not shown) may be used instead of the internal combustion engine 10 to power both electric motors 40, 48 in the second mode.

In the third, medium speed mode each of the propellers 38, 44 is driven directly by only the respective electric motor 40, 48, and both the electric motors 40, 48 are powered by the internal combustion engine 10, with both clutches 30, 52 disengaged to enable the electric motors 40, 48 to rotate independently of the internal combustion engine 10.

Accordingly, in the arrangement shown in FIG. 10, only one internal combustion engine is used to drive the two propeller shafts 16, 46 via electric motors 40, 48 and clutches 30, 52. The optional additional stand-alone generator unit which may possibly be used in place of the internal combustion engine 10 when in the second, mid speed mode may be incorporated to save running the larger main engine 10 to provide power to the AC power circuit 20 if the main battery 22 is flat. In such a case, the power split would be different.

Figure 12A:
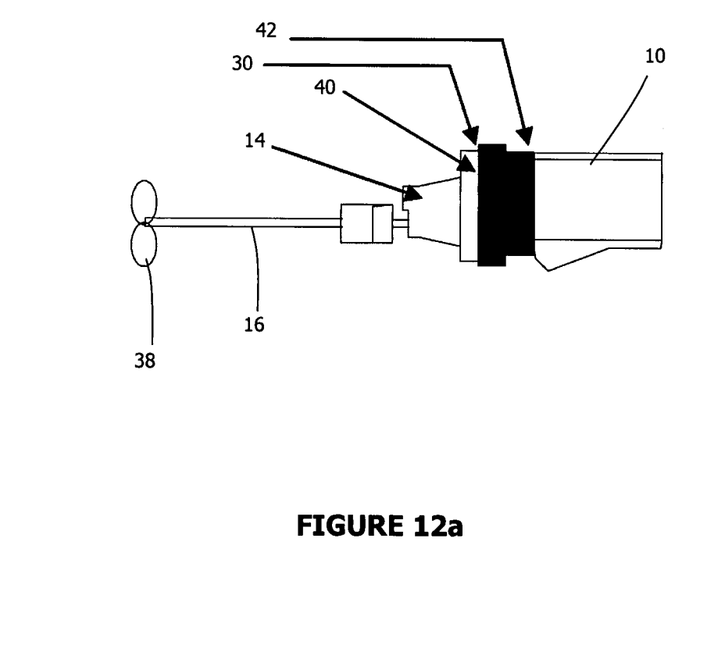
FIG. 12a shows an electric motor coupled to an internal combustion engine in series.
Figure 12B:
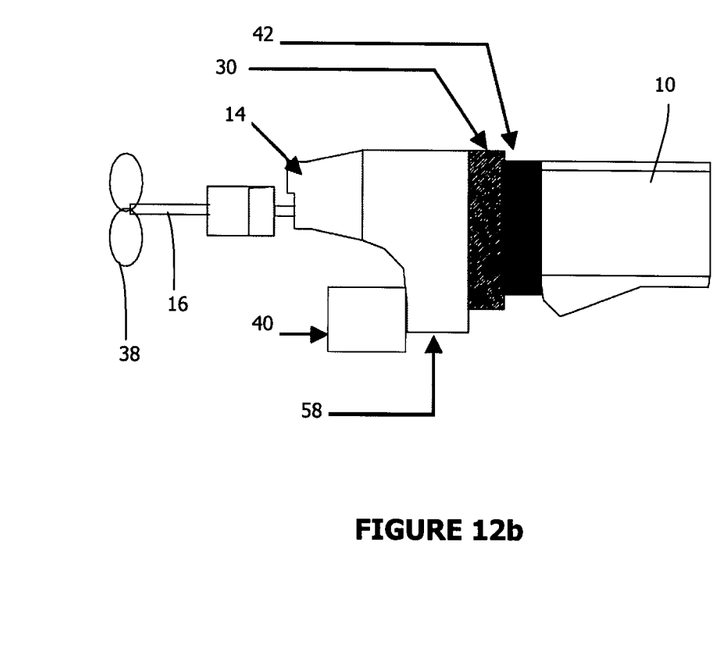
FIG. 12b shows an electric motor coupled to an internal combustion engine in parallel.

With reference to FIGS. 12a and 12b, in order to reduce the overall length of the drivetrain 34, the electric motor 40 could also be mounted in parallel, by virtue of an offset drive 58 as shown in FIG. 12b, rather than in series, as shown in FIG. 12a. In either system, the electric motor 40 can be used for both forward and reverse motion so that a conventional Forward-Neutral-Reverse gearbox would not be required. Only a reduction gearbox would/could be used, thus also saving space.

The above described hybrid marine drivetrains have been described by way of example only and modifications are possible within the scope of the invention. For example, it will be appreciated that systems in accordance with the invention could be applied to shaft drives, outboards, v-drives, jet drives, stern drives, pod drives, IPS systems, etc. Advantageously, because the system separates the generator from the electric motor, it is much more flexible than existing systems and the generator and electric motor could be substituted by hydraulic motors and pumps whereby the battery would/could be replaced by hydraulic accumulators. The electric motors on the proposed system could also be used to boost the drivetrain to help in getting the boat on the "plane" faster.

The advantages of this system are as follows:

Total engine usage is power managed for best efficiency, lower emissions and better fuel economy.

No separate generator is required in some cases which means one less engine, thus saving weight, servicing, cost, and offsetting the cost of the hybrid system and the weight of additional batteries.

The boat can be run on batteries alone.

The main engine(s) can run at its maximum efficient speed, independent of propeller shaft speed.

Redundancy—in the event that one engine or electric motor is unserviceable, both propellers can still be driven via an internal combustion engine or clutch or electric motor.

Quieter/less vibration/NVH improved/fuel efficiency.

Better low speed docking control and better low speed trolling function.

Possibly more internal boat space for cabins as fewer engines results in more usable area.

Sea/surrounding water is an endless supply of cooling water for the electric motors and batteries. This is always a problem with hybrid cars, but not hybrid boats.

The propeller shaft speed is independent of internal combustion engine speed in hybrid mode.

Opportunity to further reduce fuel tank size which could equate to more batteries and longer range on electricity.

The gearbox can be a simple reduction unit and only use the electric motor in reverse for reverse function during docking.

The applicant has foreseen future opportunities using the hybrid marine drivetrain in accordance with examples of the present invention. For example, there may be an opportunity to use this system on sailing craft, using motion through water on the propeller to charge the batteries—regeneration under sail. There may also be an opportunity to use wind, solar and/or tidal flow to charge the batteries. When the boat is at anchor, tidal flow going past the boat can turn a propeller connected to a generator to charge the batteries, in the same way that on a sail boat, as the wind pushes the boat, the propeller would be generating electricity for the batteries.

While various embodiments of the present invention have been described above, it should be understood that they have been presented by way of example only, and not by way of limitation. It will be apparent to a person skilled in the relevant art that various changes in form and detail can be made therein without departing from the spirit and scope of the invention. Thus, the present invention should not be limited by any of the above described exemplary embodiments.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavour to which this specification relates.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The claims defining the invention are as follows:

1. A hybrid marine drivetrain for a watercraft, the drivetrain including a driveshaft for driving a propulsion device of the watercraft, an internal combustion engine for driving the driveshaft, a motor for driving the driveshaft, a storage unit for storing energy in a form suitable for operating the motor, and a generator driven by the internal combustion engine for generating energy to power the motor, wherein a drive output of the motor is in direct driving connection with the driveshaft, a drive output of the internal combustion engine is in direct driving connection with a rotor of the generator, and a clutch is provided to selectively couple/decouple drive from the internal combustion engine to/from the driveshaft, wherein the drivetrain is adapted to operate in a range of modes including a hybrid mode in Which the driveshaft is driven directly by only the motor, and the motor is powered by the internal combustion engine, the internal combustion engine operating in said hybrid mode in series with the motor with the clutch disengaged to enable the motor and the engine to rotate mutually independently, the generator is arranged to power an alternating current power circuit of the watercraft via a power controller; and wherein when the drivetrain is operated in the hybrid mode the drivetrain regulates engine speed of the internal combustion engine at rotational rotational speeds below, at, or above the operating speed of the electric motor, independently of a rotational speed of the driveshaft, to drive the generator and to thereby supply power from the power controller to said alternating current power circuit, said regulation being performed according to load requirements of the alternating current power circuit and to optimise efficiency of the internal combustion engine.

2. A hybrid marine drivetrain as claimed in claim 1, wherein the motor is an electrical motor, the generator is an electrical generator, and the storage unit is a battery.

3. A hybrid marine drivetrain as claimed in claim 2, wherein the power controller is in electrical communication with the electrical motor, the generator and the battery, the power controller being adapted for converting power from the battery for driving the electric motor and for converting power from the generator for charging the battery.

4. A hybrid marine drivetrain as claimed in claim 3, wherein the generator is arranged to power the alternating current AC power circuit of the watercraft via the power controller.

5. A hybrid marine drivetrain as claimed in claim 4, wherein the power controller is arranged to supply power to the AC power circuit, both directly when the generator is operating and also by charging the battery from which AC power is drawn via an inverter when the internal combustion engine is not running.

6. A hybrid marine drivetrain as claimed in claim 5, further including a starter battery for starting the internal combustion engine, and an alternator driven by the internal combustion engine for charging the starter battery.

7. A hybrid marine drivetrain as claimed in claim 5, wherein the rotor of the generator rotates coaxially with respect to a crankshaft of the internal combustion engine.

8. A hybrid marine drivetrain as claimed in claim 7, wherein a stator of the generator is fixedly mounted relative to a casing of the internal combustion engine.

9. A hybrid marine drivetrain for a watercraft as claimed in claim 8, wherein the electric motor is arranged coaxially with the generator and internal combustion engine.

10. A hybrid marine drivetrain as claimed in claim 8, wherein the electric motor is arranged such that a rotor of the motor rotates about an axis which is offset and parallel to an axis of rotation of the generator rotor and crankshaft.

11. A hybrid marine drivetrain as claimed in claim 10, wherein drive from the electric motor is coupled to the driveshaft by an offset drive.

12. A hybrid marine drivetrain as claimed in claim 11, including a gearbox arranged to transmit drive from the electric motor and the internal combustion engine to the driveshaft.

13. A hybrid marine drivetrain as claimed in claim 12, wherein the offset drive is incorporated into the gearbox.

14. A hybrid marine drivetrain as claimed in claim 5, wherein the drivetrain is adapted to operate in said range of modes selected automatically by a control system.

15. A hybrid marine drivetrain as claimed in claim 14, wherein in a first, low speed mode the driveshaft is driven by only the motor, and the motor is powered only by energy store d in the storage unit.

16. A hybrid marine drivetrain as claimed in claim 15, wherein the motor is operable in either direction to effect either forward or reverse drive of the watercraft.

17. A hybrid marine drivetrain as claimed in claim 16, wherein said hybrid mode is in the form of a second, mid speed mode.

18. A hybrid marine drivetrain as claimed in claim 17, wherein in a third, medium speed mode the driveshaft is driven directly by only the motor, and the motor is powered by the internal combustion engine, with the clutch disengaged to enable the motor and the engine to rotate mutually independently.

19. A hybrid marine drivetrain as claimed in claim 18, wherein in a fourth, fast speed mode the clutch is engaged such that the driveshaft is driven directly by the motor and the engine.

20. A hybrid marine drivetrain as claimed in claim 19, wherein in a final, maximum speed mode the driveshaft is driven directly by only the engine.

21. A hybrid marine drivetrain as claimed in claim 18, wherein in the second and third modes engine speed of the internal combustion engine is able to be varied independently of an operating speed of the motor, to rotational speeds below, at, or above the operating speed of the motor.

22. A hybrid marine drivetrain as claimed in claim 21, wherein the drivetrain is adapted to operate the internal combustion engine at an engine speed according to fuel economy of the internal combustion engine, independent of the rotational speed of the driveshaft or the speed of the watercraft.

23. A hybrid marine drivetrain as claimed in claim 16, including an additional propulsion device, and an additional motor and clutch associated with the additional propulsion device, wherein the internal combustion engine is used in conjunction with a split output drive for transmitting drive from the internal combustion engine to both propulsion devices.

24. A hybrid marine drivetrain as claimed in claim 23, wherein in the second, mid speed mode each propulsion device is driven directly by only the respective motor, and both motors are powered by the internal combustion engine or by a separate electrical generator, with both clutches disengaged to enable the motors to rotate independently of the internal combustion engine.

25. A hybrid marine drivetrain as claimed in claim 24, wherein in the third, medium speed mode each propulsion device is driven directly by only the respective motor, and both motors are powered by the internal combustion engine, with both clutches disengaged to enable the motors to rotate independently of the internal combustion engine.

26. A hybrid marine drivetrain as claimed in claim 5, including an additional propulsion device, and an additional motor, internal combustion engine, clutch and generator associated with the additional propulsion device.

27. A hybrid marine drivetrain as claimed in claim 26, wherein the power controller is arranged in electrical communication with both electrical motors, both generators and the battery, the power controller being adapted for converting power from the battery for driving the electric motors and for converting power from the generators for charging the battery.

28. A hybrid marine drivetrain as claimed in claim 27, wherein in the second, mid speed mode each propulsion device is driven directly by only the respective motor, and both motors are powered by a single one of the internal combustion engines, the other of the internal combustion engines being switched off, with both clutches disengaged to enable the motors to rotate independently of their respective engines.

29. A hybrid marine drivetrain as claimed in claim 28, wherein in the third, medium speed mode each propulsion device is driven directly by only the respective motor, and both motors are powered by both of the internal combustion engines, with both clutches disengaged to enable the motors and their respective internal combustion engines to rotate mutually independently.

30. A hybrid marine drivetrain as claimed in claim 29, wherein the drivetrain is operable to allow different engine speeds of the two engines, the engine speeds being adjustable independently to draw more power from one engine than the other engine.

31. A hybrid marine drivetrain as claimed in claim 1, wherein the or each driveshaft is a propeller shaft.

32. A hybrid marine drivetrain as claimed in claim 1, wherein the or each propulsion device is a propeller.

* * * * *